Apr. 10, 1923.
W. C. FOWLER
CONVERTIBLE VEHICLE BODY
Filed May 24, 1922
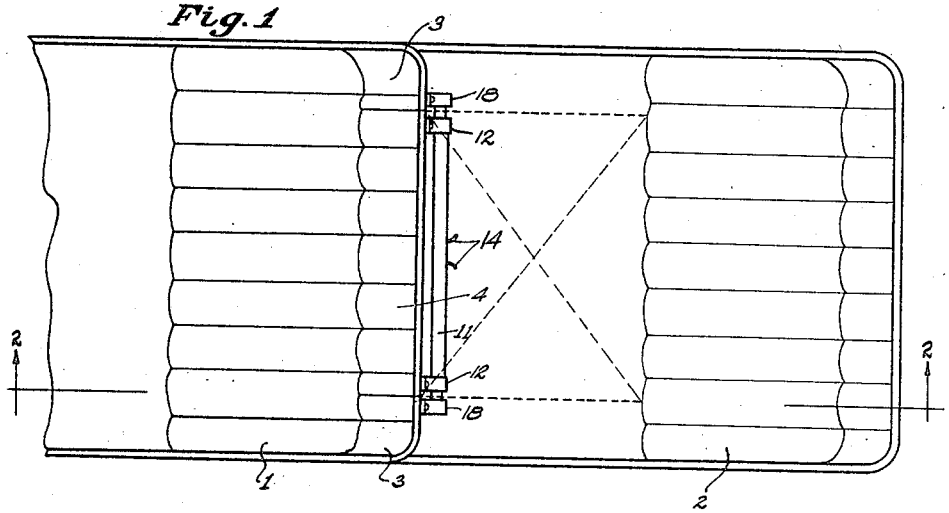
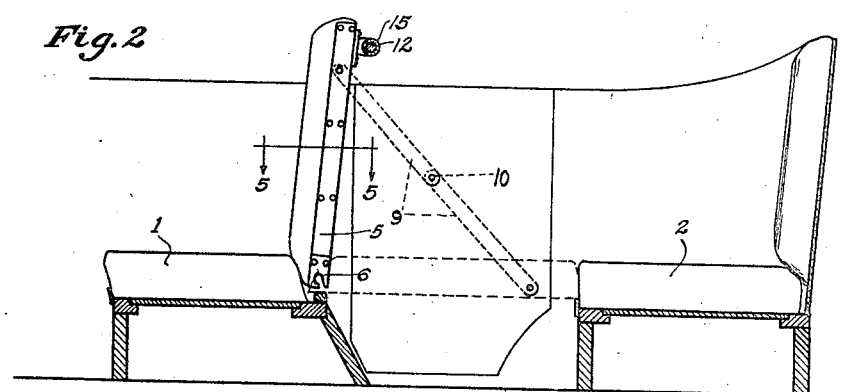
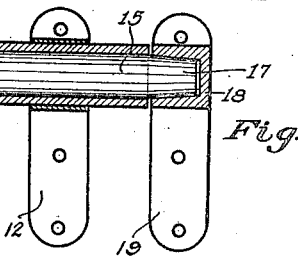
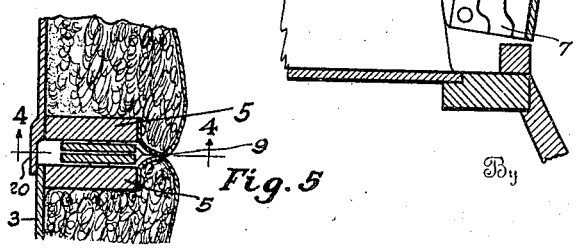
Inventor
W. C. Fowler
Attorney Patented Apr. 10, 1923.

1,451,016

UNITED STATES PATENT OFFICE.

WILLIAM C. FOWLER, OF BIRMINGHAM, ALABAMA.

CONVERTIBLE VEHICLE BODY.

Application filed May 24, 1922. Serial No. 563,391.

*To all whom it may concern:*

Be it known that I, WILLIAM C. FOWLER, a citizen of the United States of America, residing at Birmingham, in the county of Jefferson and State of Alabama, have invented certain new and useful Improvements in Convertible Vehicle Bodies, of which the following is a specification.

My invention relates to an improvement in vehicle bodies, and particularly bodies of automobiles which are convertible by folding back the front seat or a portion thereof to form a bed.

One feature of my invention relates to the manner of supporting the hinged back section in its lowered position by pivoted links which fold into concealed position when the back section is in raised position.

Another feature of my invention relates to the character of the latch means for securing the back section in raised position, this consisting of plunger rods housed in the robe rail on the hinged seat back and adapted to engage in taper sockets.

My invention further comprises the novel details of construction and arrangements of parts, which are hereinafter more particularly described and pointed out in the appended claims, reference being had to the accompanying drawings which form a part of this specification, and in which:—

Fig. 1 is a plan view of an automobile body partly broken away and showing in dotted lines the folded down position of the back bed section.

Fig. 2 is a longitudinal sectional view taken on the line 2—2 of Fig. 1, showing the back bed section in dotted lines in its lowered position.

Fig. 3 is a detail view of a portion of the robe rail and latch keeper, the robe rail being partly broken away to show a latch rod.

Fig. 4 is a partial cross-sectional view of the bottom hinge taken on the line 4—4 of Fig. 5; and Fig. 5 is a horizontal view taken on the line 5—5 of Fig. 2.

Similar reference numerals refer to similar parts throughout the drawings.

I show an automobile body, which is typical of any vehicle body, having a front seat 1, a rear seat 2, and a back for the front seat comprising two rigid end sections 3 and an intermediate section 4 which is adapted to fold down to form with the front and rear seats a bed. This section 4 is provided along each vertical end edge with a metallic brace plate 5 and it has attached at the lower end of this plate a hinge plate 6 having formed therein an angled groove 7 which at its upper or closed end is slightly tapered. The opposing edge of each of the rigid back sections 3 is likewise provided with a brace plate 5 which, at its lower end, has rigidly mounted thereon a hinge pin 8 which is adapted to be received freely into the open end of its respective slot 7 but to bear against the tapered walls of the slot before coming into contact with the upper end of the slot.

To the upper end of each of a pair of plates 5 I hinge a pair of links 9 of equal length which are pivotally connected at their free ends by a pin 10 and which are adapted to assume position in alignment so as to support the lowered back section 4 at each end from the rigid back sections 3. When section 4 is lowered to horizontal position it stands level with the seats 1 and 2 and serves therewith to form a bed.

The section 4 is provided with a tubular robe rail 11 mounted in the usual supporting brackets 12 and provided near its center with slots 13 through each of which projects a handle 15 for operating a plunger rod which is slidable in the tubular robe rail. A coil spring 16 is interposed between and seats against the inner ends of the plungers 15 and tends to force their outer tapered latch ends 17 outwardly so as to engage in slightly tapered sockets 18 mounted in brackets 19 secured on the rigid back sections 16 adjacent to the brackets 12. By grasping the handles 14 and drawing them together against the action of spring 16 both plungers can be withdrawn so as to clear the sockets 17 and release the back section 4 so that it can be swung down on its hinges. The back section 4 along each side edge is provided with an off-set flange 20 which overlaps the adjacent edge of the rigid back section 3 and covers the spaces in which the pairs of links 9 work so as to conceal the joints and give a more finished appearance to the back.

In operation, the tapered latch plungers will afford a tight anti-rattling holder for the movable back section and in like manner the tapered hinge slot 7 will permit the back section to rock freely about the pins 8 but without rattling thereon. When the back 4 is folded down, pairs of links 9 support it firmly and securely, while the angle in the slot 7 is so disposed that a rearward movement of the back section 4 will not disengage its slot from the pins without at the same time lifting the hinged end of the back section 4 and obviously this will not occur while the weight of a person is on the bed.

The slots 7 however permit the back section 4 to be lifted freely off of the pins 8 and to be swung upwardly or even over the front seat 1 so as to give convenient access to all parts for inspection and repair.

Though I have described with great particularity the details of the embodiment of the invention herein shown, it is not to be construed that I am limited thereto as changes in arrangement and substitution of equivalents may be made by those skilled in the art without departing from the invention as defined in the appended claims.

Having thus described my invention, what I claim as new and desire to secure by Letters Patent, is:—

1. A vehicle body having a seat with a back comprising two rigid end sections and a hinged rearwardly folding intermediate section, a tubular robe rail on the back of said folding section, latch keepers on said end sections, and latches concealed in the robe rail and projecting from the ends thereof to engage said keepers.

2. A vehicle body in accordance with claim 1, in which the robe rail is hollow and the latches are rods slidable in the rail and having tapered outer ends and disposed to engage in tapered sockets in the keeper, there being an interposed spring in the robe rail between the latch rods tending to press them outwardly.

In testimony whereof I affix my signature.

WILLIAM C. FOWLER.

Witness:
NOMIE WELSH,